(12) United States Patent
Misawa

(10) Patent No.: US 8,648,953 B2
(45) Date of Patent: Feb. 11, 2014

(54) IMAGE DISPLAY APPARATUS AND METHOD, AS WELL AS PROGRAM

(75) Inventor: Takeshi Misawa, Miyagi (JP)

(73) Assignee: FUJIFILM Corporation, Tokyo (JP)

( * ) Notice: Subject to any disclaimer, the term of this patent is extended or adjusted under 35 U.S.C. 154(b) by 520 days.

(21) Appl. No.: 12/830,055

(22) Filed: Jul. 2, 2010

(65) Prior Publication Data

US 2011/0001802 A1 Jan. 6, 2011

(30) Foreign Application Priority Data

Jul. 3, 2009 (JP) ................................. 2009-158379

(51) Int. Cl.
*H04N 15/00* (2006.01)

(52) U.S. Cl.
USPC .......................... 348/333.05; 348/51; 345/422

(58) Field of Classification Search
USPC ............................. 348/333–584; 345/419–427
See application file for complete search history.

(56) References Cited

U.S. PATENT DOCUMENTS

| | | | | |
|---|---|---|---|---|
| 5,592,599 | A * | 1/1997 | Lindholm ..................... | 345/427 |
| 6,118,843 | A * | 9/2000 | Jang et al. ........................ | 378/41 |
| 6,441,864 | B1 * | 8/2002 | Minami et al. ................ | 348/584 |
| 6,590,573 | B1 * | 7/2003 | Geshwind ..................... | 345/419 |
| 7,586,534 | B2 * | 9/2009 | Suto et al. ................ | 348/333.09 |
| 8,111,946 | B2 * | 2/2012 | Izawa et al. ................... | 382/284 |
| 2006/0155442 | A1 * | 7/2006 | Luo et al. ......................... | 701/45 |
| 2007/0285554 | A1 * | 12/2007 | Givon ........................... | 348/340 |

FOREIGN PATENT DOCUMENTS

| | | |
|---|---|---|
| JP | 2001-12927 A | 1/2001 |
| JP | 2003-99807 A | 4/2003 |
| JP | 2006-201950 A | 8/2006 |
| JP | 2006-211383 A | 8/2006 |

OTHER PUBLICATIONS

Japanese Office Action issued in corresponding JP Patent application 2009-158379 dated Dec. 18, 2012 with partial English translation.

* cited by examiner

*Primary Examiner* — Christopher S Kelley
*Assistant Examiner* — Jonathan Messmore
(74) *Attorney, Agent, or Firm* — Birch, Stewart, Kolasch & Birch, LLP

(57) ABSTRACT

A stereoscopic image for allowing stereoscopic viewing, which is generated from two or more images obtained from different viewpoints, is obtained. Depth information, which indicates a distance in the depth direction of the stereoscopic image of at least one subject contained in the stereoscopic image, is obtained. A depth image is generated by positioning a subject image with relating the distance in the depth direction of the subject to a distance in the depth direction from a reference position to a position of the subject image. Display of the subject image positioned in the depth image is controlled in a manner that the subject image is rotatable about an axis perpendicular to the depth direction, and the depth image with display of the subject image contained therein being controlled to be rotatable is displayed.

16 Claims, 9 Drawing Sheets

FIG.4
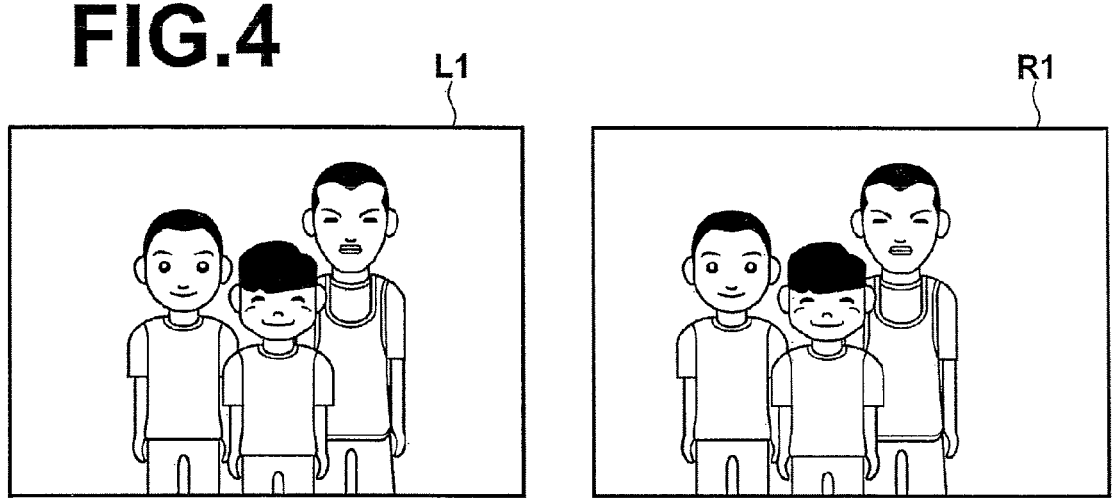
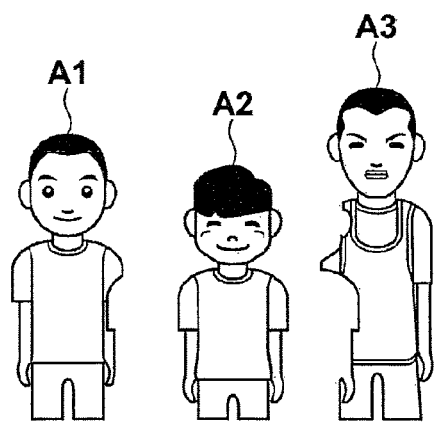
FIG.5
FIG.6
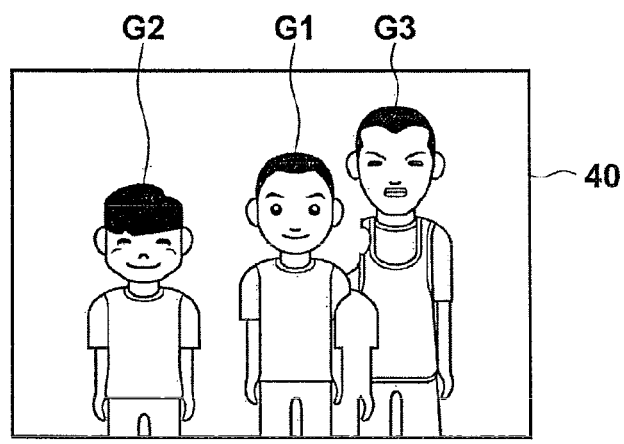

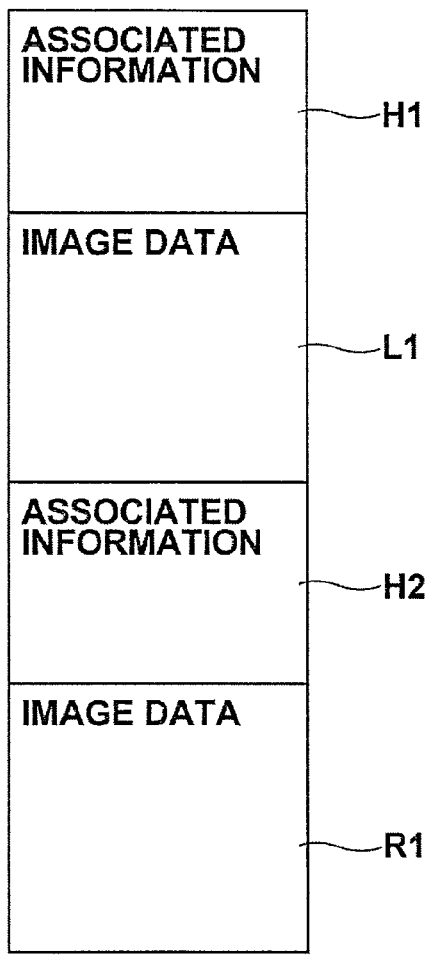

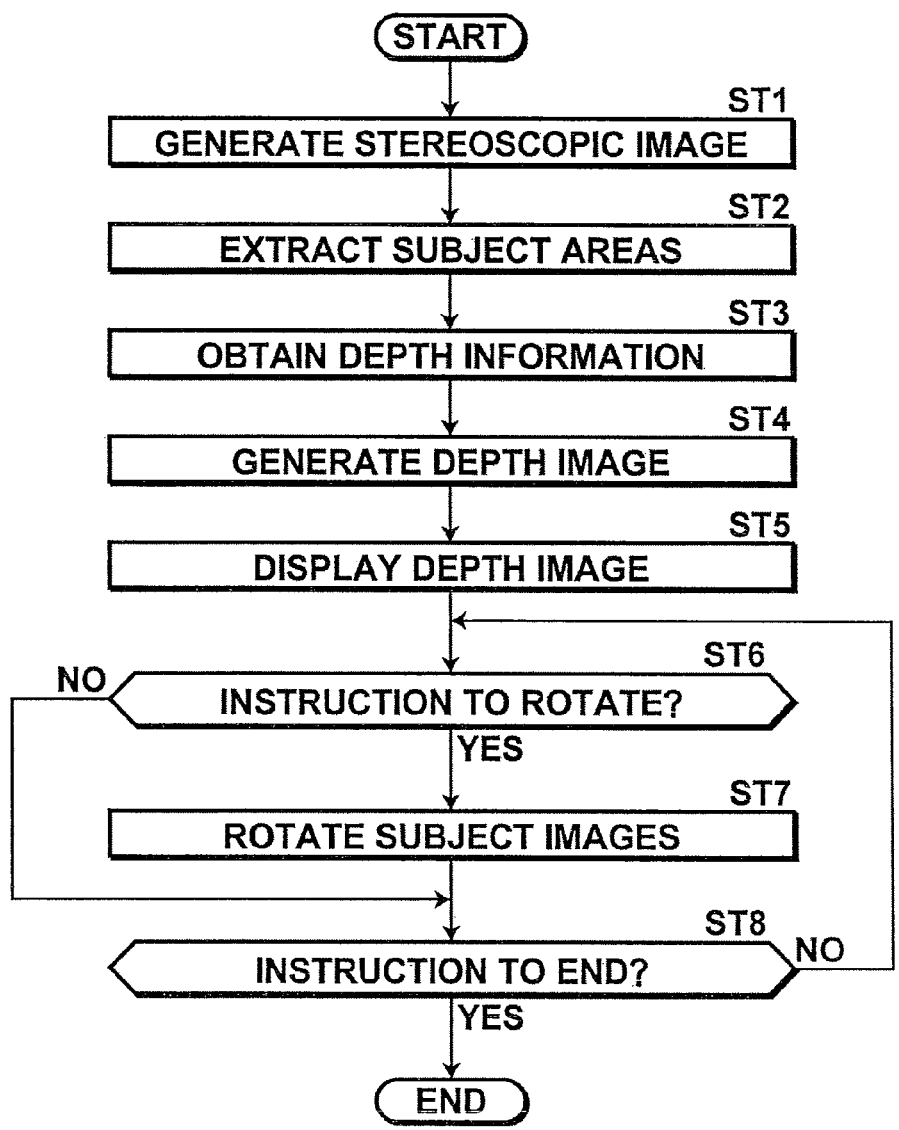

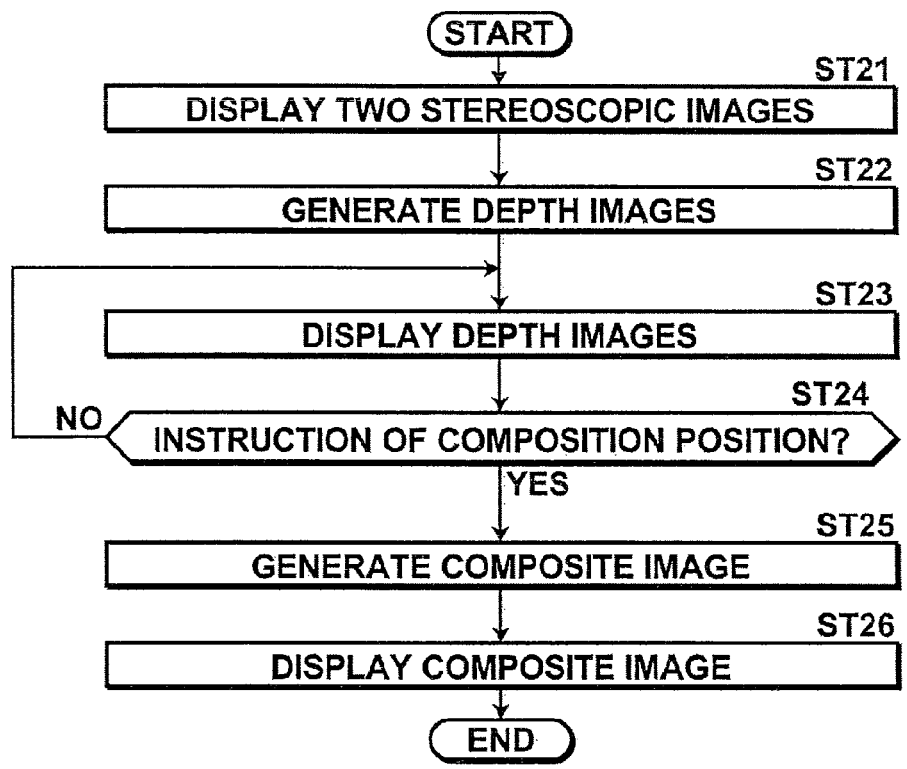
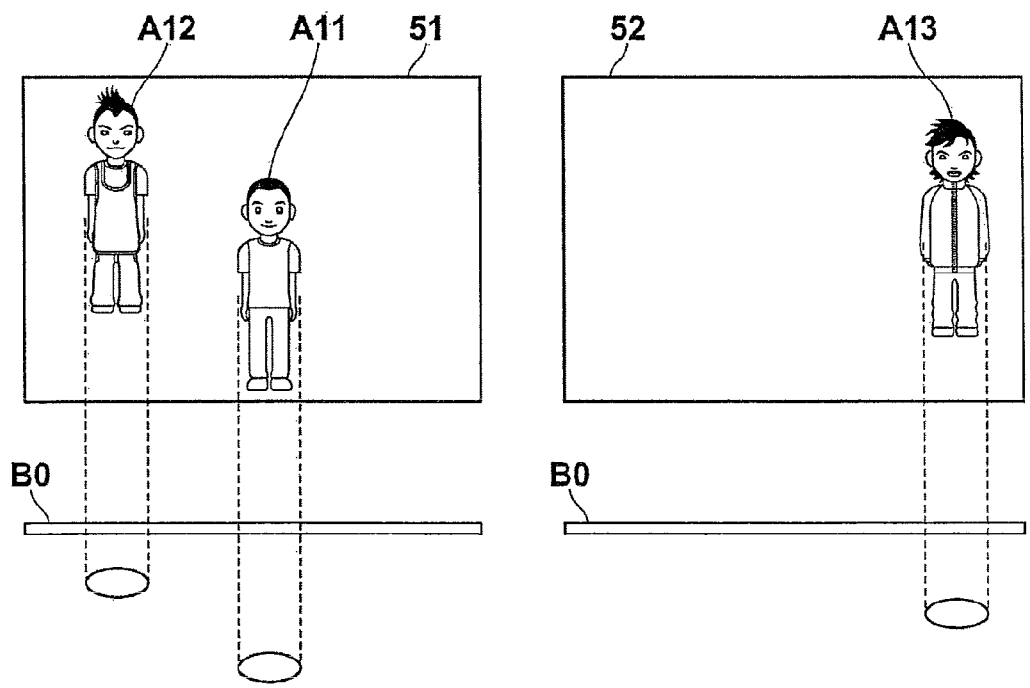

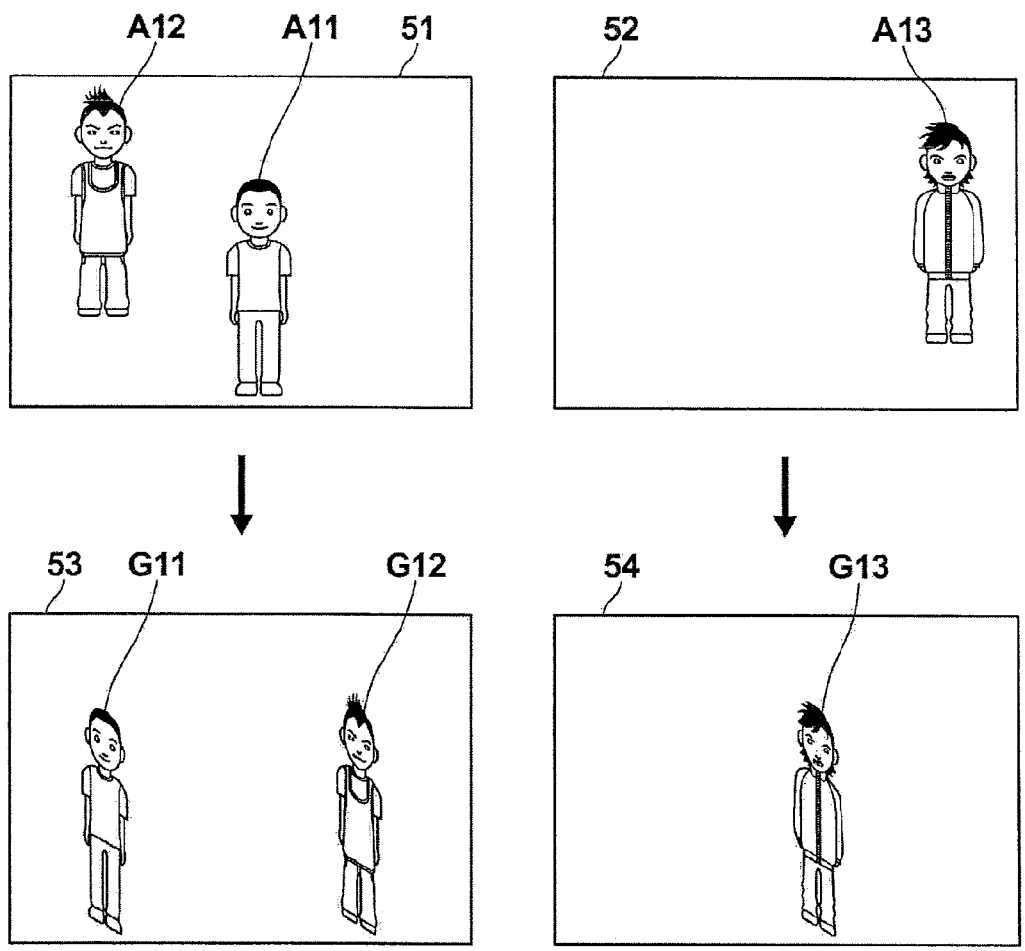
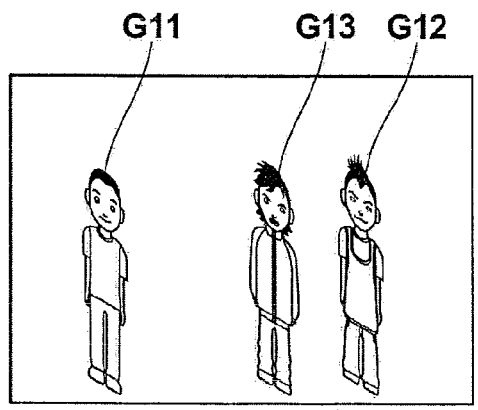

IMAGE DISPLAY APPARATUS AND METHOD, AS WELL AS PROGRAM

CROSS-REFERENCE TO RELATED APPLICATIONS

This application claims priority to Japanese Patent Application No. 2009-158379 filed on Jul. 3, 2009, the entire contents of which are hereby incorporated by reference.

BACKGROUND OF THE INVENTION

1. Field of the Invention

The present invention relates to an image display apparatus and an image display method for generating and displaying a depth image, which indicates a depth of a stereoscopic image, from a stereoscopic image for stereoscopic viewing, as well as a program for causing a computer to carry out the image display method.

2. Description of the Related Art

It has been known that stereoscopic viewing can be achieved with using parallax by generating a stereoscopic image, which allows stereoscopic viewing, from two or more images of the same subject taken from different viewpoints and stereoscopically displaying the stereoscopic image. As a specific technique for stereoscopically displaying the stereoscopic image, it has been proposed to display the two or more images on a monitor which allows stereoscopic viewing, such as a monitor of a parallax barrier system or a lenticular system. In this case, the stereoscopic display is achieved by generating a stereoscopic image by cutting the two or more images into vertical strips and alternately arranging the strips. Further, a technique to achieve the stereoscopic display with using afterimage effect has been proposed, in which display of a left image and display of a right image are alternated by switching the display at a high speed with changing the direction of light beams from the left image and the right image through the use of image separation glasses or an optical element attached on a liquid crystal display (scanning backlight system).

Further, various techniques for improving appearance of the stereoscopically displayed stereoscopic images have been proposed. For example, a technique to be used when a composite image is generated by combining a stereoscopic image obtained through photographing and a stereoscopic image generated using a CG technique has been proposed (see Japanese Unexamined Patent Publication No. 2006-211383, which is hereinafter referred to as Patent Document 1). In this technique, frequency characteristics of the stereoscopic images are adjusted to eliminate a feeling of strangeness of the composite image.

However, although the technique disclosed in Patent Document 1 allows elimination of the feeling of strangeness when the stereoscopic images are combined, a distance in the depth direction of each subject contained in the stereoscopic images cannot be checked. Therefore, the positional relationship in the depth direction between the subjects contained in the composite image may be altered from the actual positional relationship.

SUMMARY OF THE INVENTION

In view of the above-described circumstances, the present invention is directed to allow checking of a distance in the depth direction of each subject contained in stereoscopic images in a easy manner.

An aspect of the image display apparatus according to the invention image display apparatus includes: stereoscopic image obtaining means for obtaining a stereoscopic image for allowing stereoscopic viewing, the stereoscopic image being generated from two or more images obtained from different viewpoints; depth information obtaining means for obtaining depth information, the depth information indicating a distance in the depth direction of the stereoscopic image of at least one subject contained in the stereoscopic image; depth image generating means for generating a depth image by positioning a subject image with relating the distance in the depth direction of the subject to a distance in the depth direction from a reference position to a position of the subject image; rotation display controlling means for controlling display of the subject image positioned in the depth image in a manner that the subject image is rotatable about an axis perpendicular to the depth direction; and displaying means for displaying the depth image with display of the subject image contained therein being controlled to be rotatable.

The "distance in the depth direction of the stereoscopic image" herein refers to a distance along the optical axis direction from the photographing apparatus to the subject when photographing for obtaining the stereoscopic image is carried out. Specifically, it is a distance to the subject with a predetermined reference position (for example, the position of the image pickup device or the principal point of the imaging lens in the photographing apparatus) being the reference. Further, since the subject usually has a three-dimensional shape, the distance in the depth direction varies at different points on the subject. Therefore, as the distance to the subject, it is preferable to use a distance at a predetermined point on the subject, an average of distances within a predetermined area on the subject, or an average of distances over the entire area on the subject, for example.

The "axis perpendicular to the depth direction" herein refers to an axis that is actually perpendicular to the depth direction of the stereoscopic image. Therefore, depending on which direction in the depth image is set as the depth direction, the "axis perpendicular to the depth direction" may not necessarily be perpendicular to the depth direction in the depth image. For example, if the horizontal direction of the depth image is set as the depth direction and the subject images are arranged along the horizontal direction of the depth image, the "axis perpendicular to the depth direction" is also perpendicular to the depth direction in the depth image. In contrast, if a three-dimensional space is set in the depth image by setting the x-axis along the horizontal direction, the z-axis along the vertical direction and the y-axis along a diagonal direction of the depth image, and setting the y-axis as the depth direction, the axis perpendicular to the depth direction is the z-axis in the depth image. Therefore, the "axis perpendicular to the depth direction" is not perpendicular to the depth direction in the depth image.

The description "in a manner that the subject image is rotatable about an axis perpendicular to the depth direction" herein refers to reducing the size of each subject image in a direction perpendicular to the axis perpendicular to depth direction by compressing the size of the subject image in the direction perpendicular to the perpendicular axis, so that each plate-like subject image appears as if it is rotated about the axis perpendicular to the depth direction when the depth image is displayed. It should be noted that, when the size of the subject image is compressed, image portions of the subject image on the left and on the right of the reference axis for rotation are shifted in the opposite directions parallel to the axis, thereby making the plate-like subject image appear as being rotated with a three-dimensional appearance added thereto. It should be noted that the subject image can be rotated in the opposite direction by restoring the size of the compressed subject image.

The image display apparatus according to the invention may further include subject extracting means for extracting a predetermined subject contained in the stereoscopic image, wherein the depth information obtaining means may obtain the depth information of the predetermined subject, and wherein the depth image generating means may generate the depth image containing a two-dimensional subject image representing the predetermined subject.

In the image display apparatus according to the invention, the displaying means may display the stereoscopic image together with the depth image.

An aspect of the image display method according to the invention is an image display method including the steps of: obtaining a stereoscopic image for allowing stereoscopic viewing, the stereoscopic image being generated from two or more images obtained from different viewpoints; obtaining depth information, the depth information indicating a distance in the depth direction of the stereoscopic image of at least one subject contained in the stereoscopic image; generating a depth image by positioning a subject image with relating the distance in the depth direction of the subject to a distance in the depth direction from a reference position to a position of the subject image; controlling display of the subject image positioned in the depth image in a manner that the subject image is rotatable about an axis perpendicular to the depth direction; and displaying the depth image with display of the subject image contained therein being controlled to be rotatable.

The image display method according to the invention may further include the steps of: extracting a predetermined subject contained in the stereoscopic image; obtaining the depth information of the predetermined subject; and generating the depth image containing a two-dimensional subject image representing the predetermined subject.

In the image display method according to the invention, the stereoscopic image may be displayed together with the depth image.

The image display method according to the invention may be implemented in the form of a program for causing a computer to carry out the image display method.

According to the present invention, depth information indicating a distance in the depth direction of the stereoscopic image of at least one subject contained in the stereoscopic image is obtained, a depth image is generated by positioning a subject image with relating the distance in the depth direction of the subject to a distance in the depth direction from a reference position to a position of the subject image, display of the subject image positioned in the depth image is controlled in a manner that the subject image is rotatable about an axis perpendicular to the depth direction, and the depth image is displayed with display of the subject image contained therein being controlled to be rotatable. Thus, the user viewing the depth image can easily recognize the distance in the depth direction of the subject contained in the stereoscopic image. This facilitates check of the position in the depth direction of the subject contained in the stereoscopic image. In particular, in a case where two or more stereoscopic images are combined, the depth images generated according to the invention are useful to prevent erroneous recognition of the distance relationship in the depth direction among the subjects, thereby allowing generation of a composite image that provides a correct stereoscopic effect.

Further, display of the subject image positioned in the depth image is controlled in a manner that the subject image is rotatable about an axis perpendicular to the depth direction. Therefore, when the depth image is displayed, each plate-like subject image appears as being rotated about the axis perpendicular to the depth direction. Thus, a three-dimensional appearance can be added to the subject image contained in the depth image.

Furthermore, by extracting a predetermined subject contained in the stereoscopic image, obtaining the depth information of the predetermined subject, and generating the depth image containing a two-dimensional subject image representing the predetermined subject, the positional relationship of the predetermined subject in the depth direction of the stereoscopic image can easily be checked.

Moreover, by displaying the stereoscopic image together with the depth image, the position in the depth direction of the subject contained in the stereoscopic image can be checked while checking the stereoscopic effect by viewing the stereoscopic image.

BRIEF DESCRIPTION OF THE DRAWINGS

FIG. 4 is a diagram illustrating images obtained by the imaging units, FIG. 5 is a diagram illustrating extracted subject areas, FIG. 6 is a diagram illustrating a depth image, FIG. 9 is a diagram illustrating a file format of an image file, FIG. 10 is a diagram illustrating contents of associated information, FIG. 11 is a flow chart illustrating a process to be carried out during generation of the depth image in an embodiment of the invention, FIG. 12 is a flow chart illustrating a process to be carried out during image combining in an embodiment of the invention, FIG. 13 is a diagram illustrating two stereoscopic images to be used for image combining, FIG. 14 is a diagram illustrating depth images of the two stereoscopic images to be used for image combining, FIG. 15 is a diagram for explaining an instruction of composition position.

DESCRIPTION OF THE PREFERRED EMBODIMENTS

Figure 1:
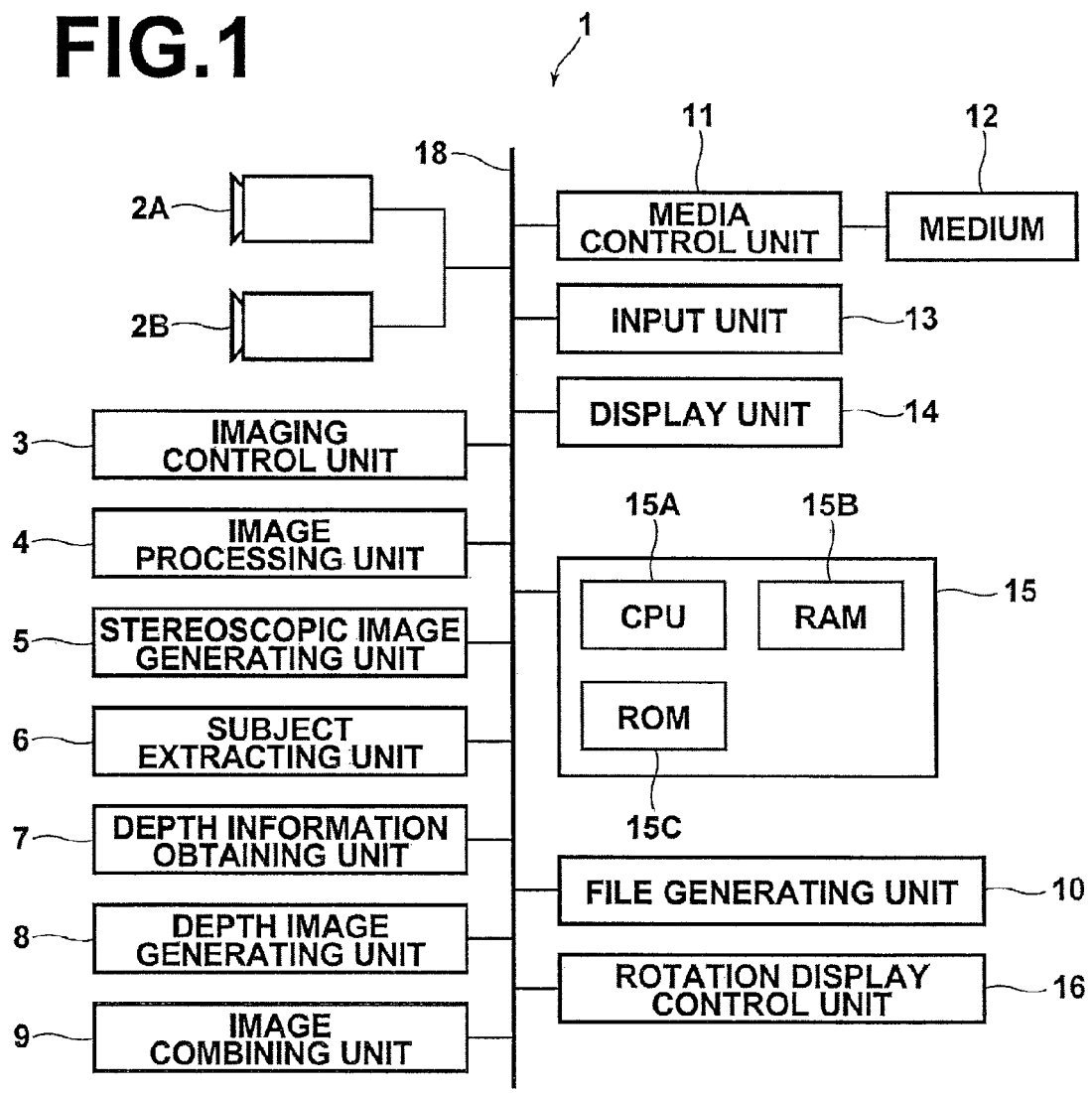
FIG. 1 is a schematic block diagram illustrating the configuration of a binocular photographing apparatus, to which an image display apparatus according to an embodiment of the invention is applied.

Hereinafter, embodiments of the present invention will be described with reference to the drawings. FIG. 1 is a schematic block diagram illustrating the configuration of a binocular photographing apparatus, to which an image display apparatus according to an embodiment of the invention is applied. As shown in FIG. 1, the binocular photographing apparatus 1 according to this embodiment includes two imaging units 2A and 2B, an imaging control unit 3, an image processing unit 4, a stereoscopic image generating unit 5., a subject extracting unit 6, a depth information obtaining unit 7, a depth image generating unit 8, an image combining unit 9, a file generating unit 10, a media control unit 11, an input unit 13 including manual operation buttons, etc., to allow various inputs, a display unit 14, such as a LCD monitor, to carry out various display, and a control unit 15, and these units are connected via a bus 18.

Figure 2:
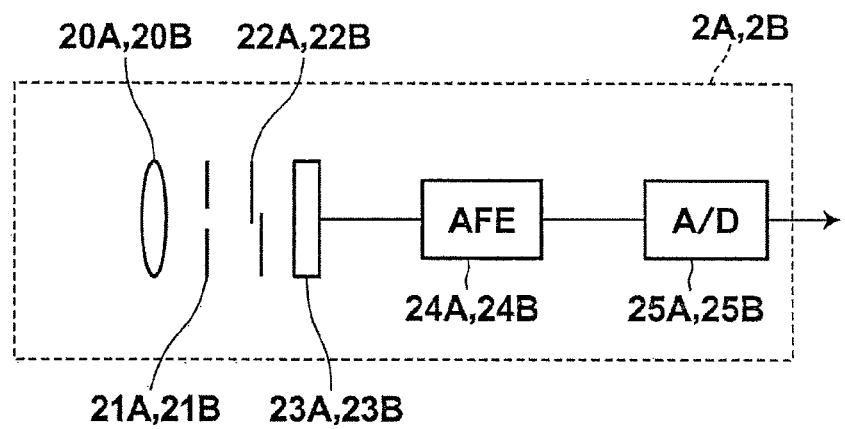
FIG. 2 is a diagram illustrating the configuration of each imaging unit.
Figure 3:
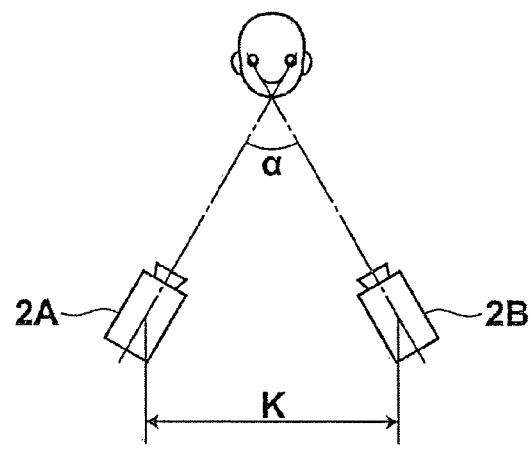
FIG. 3 is a diagram for explaining positioning of the imaging units.

FIG. 2 is a diagram illustrating the configuration of each of the imaging units 2A and 2B. As shown in FIG. 2, each imaging unit 2A, 2B includes a lens 20A, 20B, an aperture diaphragm 21A, 21B, a shutter 22A, 22B, an image pickup device 23A, 23B, an analog front end (AFE) 24A, 24B and an A/D converting unit 25A, 25B, respectively. As shown in FIG. 3, the imaging units 2A and 2B are positioned to have a convergence angle α with respect to the subject and a predetermined base line length K. The information of the convergence angle and the base line length are stored in a ROM 15C, which will be described later.

Each lens 20A, 20B is formed by lenses having different functions, such as a focusing lens for focusing on a subject and a zoom lens for effecting zooming. The positions of the lenses forming each lens 20A, 20B are adjusted by a lens driving unit (not shown) based on focus data, which is obtained through AF processing carried out by the imaging control unit 3, and a zoom data, which is obtained when a zoom lever (not shown) is operated.

An aperture diameter of each aperture diaphragm 21A, 21B is controlled by an aperture diaphragm driving unit (not shown) based on aperture value data, which is obtained through AE processing carried out by the imaging control unit 3.

Each shutter 22A, 22B is a mechanical shutter, and is driven by a shutter driving unit (not shown) according to a shutter speed, which is obtained through the AE processing.

Each image pickup device 23A, 23B includes a photoelectric surface, on which a large number of light-receiving elements are arranged two-dimensionally. A light image of the subject is focused on the photoelectric surface and is subjected to photoelectric conversion to provide an analog imaging signal. Further, a color filter formed by regularly arrayed R, G and B color filters are disposed on the front side of each image pickup device 23A, 23B.

Each AFE 24A, 24B processes the analog imaging signal fed from the image pickup device 23A, 23B to remove noise from the analog imaging signal and control gain of the analog imaging signal (this operation is hereinafter referred to as "analog processing").

Each A/D converting unit 25A, 25B converts the analog imaging signal, which has been subjected to the analog processing by the AFE 24A, 24B, into a digital imaging signal. It should be noted that the images represented by digital image data acquired by the imaging units 2A and 2B are referred to as images L1 and R1, respectively.

The imaging control unit 3 includes an AF processing unit and an AE processing unit (not shown). When a release button, which is included in the input unit 13, is half-pressed, the imaging units 2A and 2B acquire preliminary images. Then, the AF processing unit determines a focal distance for each lens 20A, 20B based on the preliminary images, and outputs the information to the imaging units 2A and 2B. The AE processing unit determines the aperture value and the shutter speed based on the preliminary images, and outputs the information to the imaging units 2A and 2B. It should be noted that photographing may be carried out using predetermined focal position, aperture value and shutter speed without carrying out the AF processing and the AE processing.

When the release button is fully pressed, the imaging control unit 3 instructs the imaging units 2A and 2B to carry out actual imaging to acquire actual images of the images L1 and R1 for generating the stereoscopic image. It should be noted that, before the release button is operated, the imaging control unit 3 instructs the imaging units 2A and 2B to acquire live view images, which have fewer pixels than the actual images, for checking imaging ranges of the imaging units 2A and 2B.

The images L1 and R1 are obtained by photographing a subject from two different photographing positions using the imaging units 2A and 2B, as shown in FIG. 3. The image displayed on the left during generation of the stereoscopic image is the image L1, and the image displayed on the right is the image R1.

Although the stereoscopic image is generated from two images L1 and R1 in this embodiment, three or more imaging units may be provided, and the stereoscopic image may be generated from three or more images obtained by photographing the subject from three or more different photographing positions.

The image processing unit 4 applies, to the digital image data of the images L1 and R1 obtained by the imaging units 2A and 2B, correction processing to correct for misalignment of the angle of view between the imaging units 2A and 2B, a difference of zoom ratio, misalignment between images due to rotation of the image pickup devices, trapezoidal distortion caused due to the imaging units 2A and 2B photographing the subject with the convergence angle α, etc., as well as image quality correction processing, such as white balance adjustment, tone correction, sharpness correction and color correction. In this description, the images L1 and R1 processed by the image processing unit 4 are also denoted by the same reference symbols L1 and R1 for the unprocessed images.

The stereoscopic image generating unit 5 generates the stereoscopic image from the images L1 and R1 in order to stereoscopically display the images L1 and R1 on the display unit 14. The technique used to achieve the stereoscopic display in this embodiment may be any of known techniques. For example, the images L1 and R1 may be displayed side by side to achieve the stereoscopic viewing through parallel viewing with naked eyes. In this case, the stereoscopic image contains the images L1 and R1 arranged side by side. Alternatively, a lenticular system may be used, in which a lenticular lens is attached on the display unit 14, and the images L1 and R1 are cut into strips and the strips are alternately arranged to be displayed at predetermined positions on the display surface of the display unit 14, so that the light from the image L1 and the light from the image R1 are respectively enter the left eye and the right eye to achieve the stereoscopic display. Further alternatively, a parallax barrier system may be used, in which a barrier for changing optical paths toward the left and right eyes is attached on the display unit 14, and the images L1 and R1 are cut into strips and the strips are alternately arranged to be displayed at predetermined positions on the display surface of the display unit 14, so that the light from the image L1 and the light from the image R1 are respectively enter the left eye and the right eye to achieve the stereoscopic display. In the cases of the lenticular system and the parallax barrier system, the stereoscopic image contains the alternately arranged strips of the images L1 and R1.

Further alternatively, the stereoscopic display may be achieved by combining the images L1 and R1 by overlapping the images L1 and R1 with changing the colors of the images L1 and R1 into colors different from each other, such as red and blue, or by overlapping the images L1 and R1 with providing different polarization directions of the images L1 and R1 (anaglyph system, polarization filter system). In this case, the stereoscopic image contains the images L1 and R1 overlapped with each other. Further, a scanning backlight system may be used, which achieves the stereoscopic display by optically separating the optical paths of the backlights of the display unit 14 correspondingly to the left and right eyes in an alternate manner, and alternately displaying the images L1 and R1 on the display surface of the display unit 14 according to the separation of the backlights toward the left and right. In this case, the stereoscopic image is a dynamically changing image which is formed by the alternately displayed images L1 and R1.

The display unit 14 is modified according to the type of the stereoscopic display system. For example, in a case where the stereoscopic display is implemented with the lenticular system, a lenticular lens is attached on the display surface of the display unit 14. In a case of the parallax barrier system, a barrier is attached on the surface of the display unit 14. In a case of the scanning backlight system, an optical element for changing directions of the light beams from the left and right images is attached on the display surface of the display unit 14.

The subject extracting unit 6 extracts an area of a predetermined subject as a subject area from the images L1 and R1. In this embodiment, a person is used as the predetermined subject. The subject extracting unit 6 detects a face from the images L1 and R1 through a technique using template matching or a technique using face classifiers obtained through a machine learning process using a number of sample face images, and further detects an area that is adjacent to the face and different from the background as the body of the person. Then, an area including the face and the body is extracted as the subject area of the person. If there are two or more persons contained in the images L1 and R1, the subject extracting unit 6 extracts the subject areas for all the persons. It should be noted that, among persons contained in the images L1 and R1, a person having a size which is too small tends to be a person who was not intended to be photographed by the photographer. Therefore, the subject extracting unit 6 extracts only a person having an area which is not less than a predetermined threshold as the subject area.

The depth information obtaining unit 7 generates depth information for the subject extracted by the subject extracting unit 6. The depth information indicates a distance in the depth direction of the stereoscopic image generated by the stereoscopic image generating unit 5. Specifically, a distance from the imaging units 2A and 2B to the extracted subject contained in the imaging ranges of the imaging units 2A and 2B is measured, and the depth information is generated from the measured distance. Now, generation of the depth information is described.

The depth information obtaining unit 7 first finds corresponding points corresponding to each other between the images L1 and R1, which are obtained by the imaging units 2A and 2B, using a stereo matching technique. For example, the corresponding points are found by taking out a partial matrix (of 3×3 pixels, for example) from each of the images L1 and R1 and calculating correlation values. Then, using the thus found corresponding points and the base line length, the convergence angle and the zoom ratio of the imaging units 2A and 2B, a distance (subject distance) to the subject contained in both of the images L1 and R1 is calculated according to the principle of triangulation. Specifically, the distance is calculated for each pixel in the subject area extracted from the images L1 and R1.

Further, the depth information obtaining unit 7 calculates an average of the distances calculated for the individual pixels in the subject area as the depth information that indicates the distance to the subject. For example, in a case where the images L1 and R1 containing three persons are obtained, as shown in FIG. 4, the subject extracting unit 6 extracts subject areas A1 to A3 which respectively correspond to the three persons from the images L1 and R1, as shown in FIG. 5. Therefore, the depth information obtaining unit 7 calculates the average distance for each of the subject areas A1 to A3 to provide depth information D1 to D3.

The depth image generating unit 8 generates a depth image, which contains the images of the subject areas A1 to A3 positioned according to the depth information D1 to D3, i.e., their distances. FIG. 6 is a diagram illustrating the depth image. As shown in FIG. 6, the horizontal direction of the depth image 40 represents the depth of the stereoscopic image, and two-dimensional images (which are referred to as subject images) G1 to G3 of the subject areas A1 to A3 are arranged in the depth image 40 in the order of the distance. In FIG. 6, the left end of the depth image 40 is the reference position, and the distance increases toward the right end.

Figure 7:
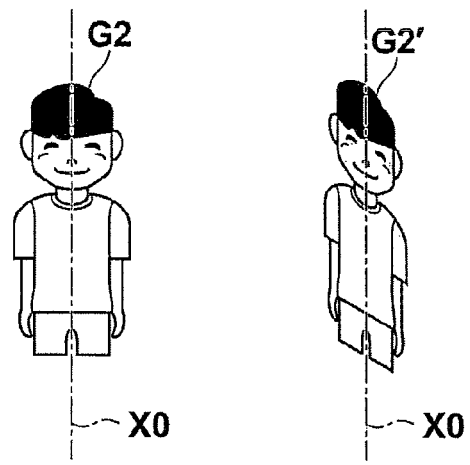
FIG. 7 is a diagram for explaining rotation of a subject image.
Figure 8:
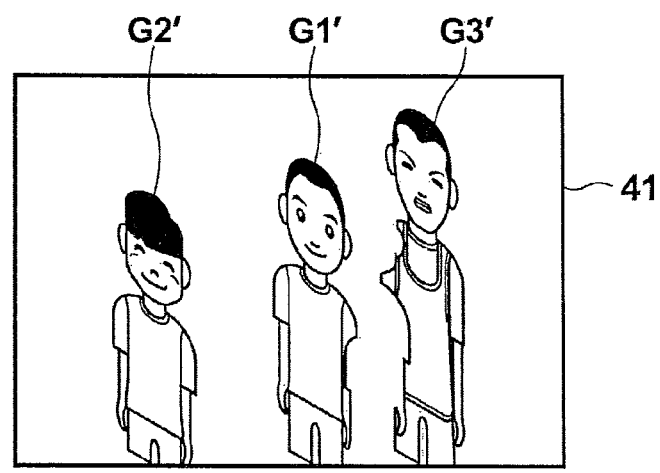
FIG. 8 is a diagram illustrating another example of the depth image.

In the depth image 40, each of the subject images G1 to G3 may be rotated about a vertical axis X0 that extends through the center of each image, as shown in FIG. 7, by shifting image portions of each of the subject images G1 to G3 on the left and on the right of the vertical axis X0 in the opposite directions, i.e., upward and downward, with compressing each of the subject images G1 to G3 in the horizontal direction. The vertical axis X0 is an axis perpendicular to the horizontal direction, i.e., the depth direction of the stereoscopic image. The rotation of the subject images G1 to G3 is achieved by a rotation display control unit 16. Thus, each of the plate-like subject images G1 to G3 appears as being rotated about the axis perpendicular to the horizontal direction, as in a depth image 41 shown in FIG. 8. The rotation of the subject images may be carried out according to an instruction to rotate the subject images received via the input unit 13. In this case, the degree of rotation effect of the subject images G1 to G3 can be changed, and therefore the depth image 40 containing the subject images G1 to G3 with a desired degree of rotation effect added thereto can be generated. In the case where the depth image 40 contains two or more subject images, all the subject images may simultaneously be rotated, or only the subject image specified via the input unit 13 may be rotated.

The image combining unit 9 generates a composite image by combining two or more stereoscopic images. The process carried out by the image combining unit 9 will be described later.

The file generating unit 10 compresses the image data of the images L1 and R1 according to a certain compression format, such as JPEG, and generates an image file F0 of the stereoscopic image. A header, which stores the associated information, such as photographing time and date, is added to the image file F0 based on the Exif format, for example. FIG. 9 is a diagram illustrating the file format of the image file F0. As shown in FIG. 9, the image file F0 stores associated information H1 of the image L1, image data of the image L1 (the image data is also denoted by the reference symbol "L1"), associated information H2 of the image R1, and image data of the image R1 (the image data is also denoted by the reference symbol "R1"). Although not shown in the drawing, information indicating the start position and the end position of the data are contained before and after the associated information and the image data of the images L1 and R1.

FIG. 10 is a diagram illustrating detailed contents of the associated information. As shown in FIG. 10, each associated information H1, H2 contains the photographing date of the image L1, R1, the base line length, the convergence angle, and positional coordinates and the depth information of each contained subject. It should be noted that the positional coordinates and the depth information for each subject are contained in the associated information. In FIG. 10, the positional coordinates and the depth information for each of two subjects A and B are contained. The positional coordinates of the subject may be coordinates at a centroid of the subject area or the center of the face area, for example.

The media control unit 11 accesses a medium 12, such as a memory card, and controls writing and reading of the image file F0.

The control unit 15 includes a CPU 15A, a RAM 15B for providing a work area for various operations carried out by the apparatus 1, and a ROM 15C storing operation programs, various constants, etc., for the apparatus 1. The control unit 15 controls the units of the apparatus 1.

Next, processes to be carried out in this embodiment are described. FIG. 11 is a flow chart illustrating a process to be carried out during generation of the depth image in this embodiment. As the user photographs the subject using the imaging units 2A and 2B and the images L1 and R1 are obtained, the control unit 15 starts the process and the stereoscopic image generating unit 5 generates the stereoscopic image from the images L1 and R1 (step ST1). Then, the subject extracting unit 6 extracts the subject areas from the images L1 and R1 (step ST2), an the depth information obtaining unit 7 obtains the depth information D1 to D3 for the individual subject areas A1 to A3 (step ST3). Further, the depth image generating unit 8 generates the depth image (step ST4), and the control unit 15 displays the depth image on the display unit 14 (step ST5). It should be noted that the operation to generate the stereoscopic image and the operation to display the depth image may be carried out in parallel, and the stereoscopic image may be generated after the depth image has been generated. Alternatively, only the depth image may be generated without generating the stereoscopic image.

Subsequently, the control unit 15 determines whether or not an instruction to rotate the subject images has been made via the input unit 13 (step ST6). If the determination in step ST6 is affirmative, the rotation display control unit 16 rotates the subject images contained in the depth image about their respective vertical axes (step ST7). If the determination in step ST6 is negative, the process proceeds to step ST8. Then, the control unit 15 determines whether or not an instruction to end has been made via the input unit 13 (step ST8). If the determination in step ST8 is negative, the process returns to step ST6. If the determination in step ST8 is affirmative, the process ends.

As described above, in this embodiment, the depth image is generated by obtaining the depth information indicating the distance in the depth direction of the stereoscopic image of each subject contained in the stereoscopic image, and arranging the subject images G1 to G3 according to the distances of the subjects. When the depth image is displayed on the display unit 14, the user can easily recognize the distance in the depth direction of each subject contained in the stereoscopic image by observing the depth image.

Further, by generating the depth image with setting the horizontal direction of the depth image as the depth direction and relating the distance in the depth direction of each subject to the distance from the left end of the depth image to the position of each subject image, the position in the depth direction of each subject in the stereoscopic image can more easily be checked.

Furthermore, by rotating the subject images about their respective vertical axes in the depth image, the depth image can be displayed with each plate-like subject image appearing as being rotated about the axis perpendicular to the horizontal direction. Thus, three-dimensional appearance can be provided to the subject images in the depth image.

Next, combining of the stereoscopic images in this embodiment is described. FIG. 12 is a flow chart illustrating a process to be carried out during the image combining. In this example, a process to generate a single composite image from two stereoscopic images is described. When an instruction to display the two stereoscopic images to be combined is made via the input unit 13, the control unit 15 starts the process and the two stereoscopic images are displayed on the display unit 14 (step ST21). FIG. 13 is a diagram illustrating the two stereoscopic images to be used for the image combining. As shown in FIG. 13, a stereoscopic image 51 contains subject areas A11 and A12 of two persons, and a stereoscopic image 52 contains a subject area A13 of one person. Each stereoscopic image has stereoscopic effect shown in FIG. 13, with a background B0 being the reference, as illustrated below the stereoscopic images 51 and 52 in FIG. 13.

When an instruction to generate the depth images of the two stereoscopic images is made via the input unit 13, the control unit 15 carries out the process of the flow chart shown in FIG. 11 to generate the depth images (step ST22), and the depth images are displayed on the display unit 14 (step ST23). FIG. 14 is a diagram illustrating the depth of images of the two stereoscopic images 51 and 52.

It is considered here that, using the above-described two stereoscopic images 51 and 52, the subject area A13 contained in the stereoscopic image 52 is combined with the stereoscopic image 51. In this case, it is not easy to recognize, only from the stereoscopic images 51 and 52, the degree of stereoscopic effect to be provided to the subject area A13, that is, the degree of parallax to be provided when the subject area A13 is combined with each of two images forming the stereoscopic image 51.

Therefore, as shown in FIG. 14, by generating depth images 53 and 54 of the stereoscopic images 51 and 52 and displaying the depth images 53 and 54 on the display unit 14, the positional relationship in the depth direction among the subject images G11 to G13 contained in the stereoscopic images 51 and 52 can easily be checked. Thus, as shown in FIG. 15, it is easy to specify the composition position in the depth direction of the stereoscopic image 51 at which the subject area A13 to be combined should be positioned, based on the positional relationship among the subject images G11 to G13 indicated by the depth images 53 and 54.

The control unit 15 determines whether or not an instruction of composition position using the depth images 53 and 54 has been made (step ST24). If the determination in step ST24 is negative, the process returns to step ST23. If the determination in step ST24 is affirmative, the image combining unit 9 generates a composite image by combining the stereoscopic images 51 and 52 (step ST25), the control unit 15 causes the display unit 14 to display the composite image (step ST26), and the process ends.

Figure 16:
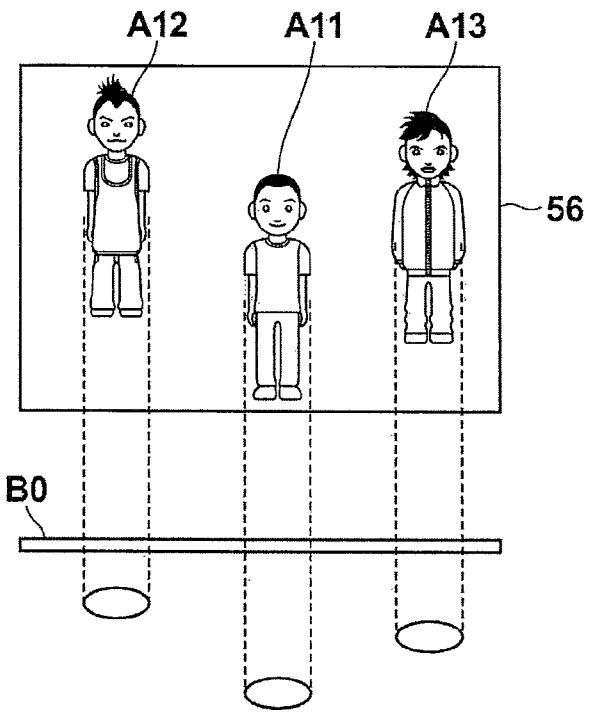
FIG. 16 is a diagram illustrating a composite image.

The image combining unit 9 generates the composite image by combining the subject area A13 into each of two images forming the stereoscopic image 51 with providing a parallax that provides a stereoscopic effect corresponding to the instructed composition position. In this manner, a composite image 56 that provides a correct feel of depth, as shown in FIG. 16, can be generated without introducing an erroneous distance relationship in the depth direction among the subjects.

Although it is set in the above-described embodiment that the horizontal direction of the depth image represents the depth direction of the stereoscopic image, this is not intended to limit the invention. The depth direction of the stereoscopic image may be represented by the vertical direction or any other predetermined direction of the depth image.

Further, although each subject image in the depth image is rotated about the vertical axis in the above-described embodiment, the subject image may be contained in the depth image without being rotated.

Figure 17:
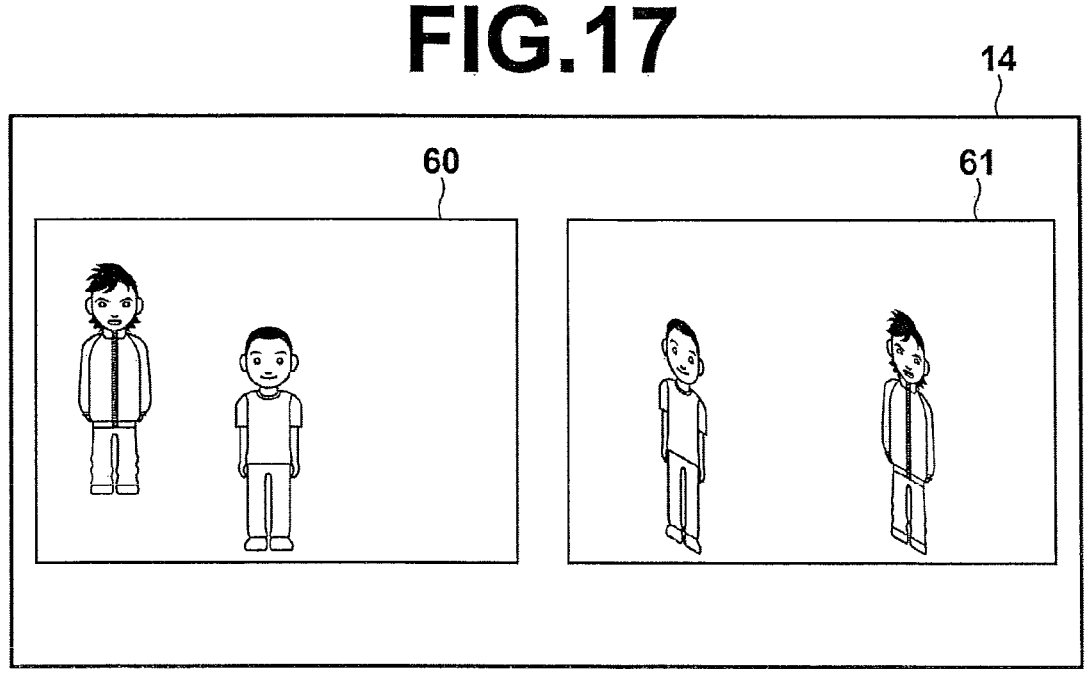
FIG. 17 is a diagram illustrating a state where the depth image and the stereoscopic image are simultaneously displayed.

In the above-described embodiment, a stereoscopic image 60 and a depth image 61 may simultaneously be displayed on the display unit 14, as shown in FIG. 17. It should be noted that the stereoscopic image 60 shown in FIG. 17 is represented by the two-dimensional image since it is impossible to provide the stereoscopic effect to the drawing. In this case, the user can check positions in the depth direction of the subjects contained in the stereoscopic image 60 by viewing the depth image 61 while checking the stereoscopic effect by viewing the stereoscopic image 60.

Further, although the subject extracting unit 6 extracts a person as the subject area in the above-described embodiment, the subject extracting unit 6 may extract only the face of a person as the subject area. Alternatively, the subject extracting unit 6 may extract a structure other than a person, such as tree, grass, river, road or building, as the subject area.

Further, although the depth information obtaining unit 7 generates the depth information of the subject area by finding the corresponding points between the images L1 and R1 using a stereo matching technique and calculating the distance from the photographing apparatus 1 to the subject in the above-described embodiment, the depth information obtaining unit 7 may generate the depth information using any other technique. For example, the binocular photographing apparatus 1 may include TOF (Time Of Flight) cameras, which measure a time from emission of distance measurement light toward a subject to return of the distance measurement light reflected from the subject to measure a distance from the binocular photographing apparatus 1 to the subject, and may photograph the subject using the TOF cameras, thereby calculating the distance from the binocular photographing apparatus 1 to the subject to generate the depth information of the subject area. Further alternatively, a focal position of an image to be photographed may be detected, and the distance to the subject may be calculated based on the focal position to provide the depth information.

Further alternatively, the stereoscopic image and a distance image, which has been generated in advance and indicates a distance of each subject contained in the stereoscopic image, may be recorded in the medium 12, and the depth information may be obtained by reading out the distance image from the medium 12. It should be noted that the distance image is formed by pixels having pixel values which indicate distance values calculated for individual pixels of the stereoscopic image.

Moreover, although the image display apparatus according to the invention is applied to the binocular photographing apparatus 1 including the imaging units 2A and 2B in the above-described embodiment, the image display apparatus according to the invention may be provided as an independent product. In this case, two or more images obtained by photographing the same subject from different positions are inputted to the image display apparatus, and the depth images are generated and displayed in the same manner as described in the above-described embodiment.

The binocular photographing apparatus 1 according to embodiments of the invention have been described. The invention may also be implemented as a program for causing a computer to function as means corresponding to the stereoscopic image generating unit 5, the subject extracting unit 6, the depth information obtaining unit 7, the depth image generating unit 8 and the image combining unit 9 described above and to carry out the processes as shown in FIGS. 11 and 12. The invention may also be implemented as a computer-readable recording medium containing such a program.

What is claimed is:

1. An image display apparatus comprising:
a stereoscopic image obtaining imaging device for obtaining a stereoscopic image for allowing stereoscopic viewing, the stereoscopic image being generated from two or more images obtained from different viewpoints;
a depth information obtaining unit in at least one processor, for obtaining depth information, the depth information indicating a distance in a depth direction of the stereoscopic image, of at least one subject contained in the stereoscopic image;
a depth image generating unit in the at least one processor, for generating a depth image by positioning a subject image, which is an image corresponding to the at least one subject contained in the stereoscopic image, while relating
the distance in the depth direction of the at least one subject, to
a distance in the depth direction from a reference position to a position of the subject image;
a rotation display controlling unit in the at least one processor, for controlling display of the subject image positioned in the depth image in a manner that the subject image is rotatable about an axis perpendicular to the depth direction; and
a displaying device for displaying the depth image with display of the subject image contained therein being controlled to be rotatable, and
wherein said apparatus
obtains a plurality of stereoscopic images, wherein each stereoscopic image of said stereoscopic images comprises at least a left image and a right image,
generates depth images based on said plurality of stereoscopic images, and
receives an instruction for a composition position using said generated depth images.

2. The image display apparatus as claimed in claim 1 further comprising
a subject extracting unit for extracting a predetermined subject contained in the stereoscopic image,
wherein the depth information obtaining unit obtains the depth information of the predetermined subject, and
wherein the depth image generating unit generates the depth image containing a two-dimensional subject image representing the predetermined subject.

3. The image display apparatus as claimed in claim 1, wherein the displaying device displays the stereoscopic image together with the depth image.

4. The image display apparatus as claimed in claim 1, wherein said apparatus further generates a composite image by combining the plurality of stereoscopic images.

5. The image display apparatus as claimed in claim 1, wherein said apparatus displays said generated depth images.

6. An image display method comprising the steps of:
obtaining a stereoscopic image for allowing stereoscopic viewing, the stereoscopic image being generated from two or more images obtained from different viewpoints;
obtaining depth information, the depth information indicating a distance in a depth direction of the stereoscopic image, of at least one subject contained in the stereoscopic image;
generating a depth image by positioning a subject image, which is an image corresponding to the at least one subject contained in the stereoscopic image, while relating
the distance in the depth direction of the at least one subject, to
a distance in the depth direction from a reference position to a position of the subject image;
controlling display of the subject image positioned in the depth image in a manner that the subject image is rotatable about an axis perpendicular to the depth direction; and
displaying the depth image with display of the subject image contained therein being controlled to be rotatable, and
said method further comprising:
obtaining a plurality of stereoscopic images, wherein each stereoscopic image of said stereoscopic images comprises at least a left image and a right image,
generating depth images based on said plurality of stereoscopic images, and
receiving an instruction for a composition position using said generated depth images.

7. The image display method as claimed in claim 6 further comprising the steps of:
extracting a predetermined subject contained in the stereoscopic image;
obtaining the depth information of the predetermined subject; and
generating the depth image containing a two-dimensional subject image representing the predetermined subject.

8. The image display method as claimed in claim 6, wherein the stereoscopic image is displayed together with the depth image.

9. The image display method as claimed in claim 6, wherein said method further comprises: generating a composite image by combining the plurality of stereoscopic images.

10. The image display method as claimed in claim 6, wherein said method further comprises: displaying said generated depth images.

11. A non-transitory computer readable recording medium containing a program for causing a computer to carry out an image display method comprising the steps of:
obtaining a stereoscopic image for allowing stereoscopic viewing, the stereoscopic image being generated from two or more images obtained from different viewpoints;
obtaining depth information, the depth information indicating a distance in a depth direction of the stereoscopic image, of at least one subject contained in the stereoscopic image;
generating a depth image by positioning a subject image, which is an image corresponding to the at least one subject contained in the stereoscopic image, while relating
the distance in the depth direction of the at least one subject, to
a distance in the depth direction from a reference position to a position of the subject image;
controlling display of the subject image positioned in the depth image in a manner that the subject image is rotatable about an axis perpendicular to the depth direction; and
displaying the depth image with display of the subject image contained therein being controlled to be rotatable, and
said program causing the computer to carry out the image display method further comprising the steps of:
obtaining a plurality of stereoscopic images, wherein each stereoscopic image of said stereoscopic images comprises at least a left image and a right image,
generating depth images based on said plurality of stereoscopic images, and
receiving an instruction for a composition position using said generated depth images.

12. The non-transitory computer readable recording medium as claimed in claim 11, said program causing the computer to carry out the image display method further comprising the step of: generating a composite image by combining the plurality of stereoscopic images.

13. The non-transitory computer readable recording medium as claimed in claim 11, said program causing the computer to carry out the image display method further comprising the step of: displaying said generated depth images.

14. An image display apparatus comprising:
a stereoscopic image obtaining imaging device for obtaining one or more stereoscopic images for allowing stereoscopic viewing, the one or more stereoscopic images each being generated from two or more images obtained from different viewpoints such that each stereoscopic image comprises at least a left image and a right image;
a depth information obtaining unit in at least one processor, for obtaining depth information, the depth information indicating a distance in a depth direction of the one or more stereoscopic images, of at least two subjects contained in the one or more stereoscopic images;
a depth image generating unit in the at least one processor, for generating a depth image by positioning at least two subject images, which are each an image corresponding to one of the at least two subjects contained in the one or more stereoscopic images, while relating the distance in the depth direction of the at least two subjects, to a distance in the depth direction from a reference position to a position of the subject images;
a rotation display controlling unit in the at least one processor, for controlling display of the subject images positioned in the depth image in a manner that at least one of the subject images is rotated about an axis perpendicular to the depth direction by a different amount of rotation than another one of the subject images; and
a displaying device for displaying the depth image with display of the subject images contained therein, among which at least one of the subject images is controlled to be rotatable.

15. An image display method comprising the steps of:
obtaining one or more stereoscopic images for allowing stereoscopic viewing, the one or more stereoscopic images each being generated from two or more images obtained from different viewpoints such that each stereoscopic image comprises at least a left image and a right image;
obtaining depth information, the depth information indicating a distance in a depth direction of the one or more stereoscopic images, of at least two subjects contained in the one or more stereoscopic images;

generating a depth image by positioning at least two subject images, which are each an image corresponding to one of the at least two subjects contained in the one or more stereoscopic images, while relating the distance in the depth direction of the at least two subjects, to a distance in the depth direction from a reference position to a position of the subject images;

controlling display of the subject images positioned in the depth image in a manner that at least one of the subject images is rotated about an axis perpendicular to the depth direction by a different amount of rotation than another one of the subject images; and displaying the depth image with display of the subject images contained therein, among which at least one of the subject images is controlled to be rotatable.

16. A non-transitory computer readable recording medium containing a program for causing a computer to carry out an image display method comprising the steps of:

obtaining one or more stereoscopic images for allowing stereoscopic viewing, the one or more stereoscopic images each being generated from two or more images obtained from different viewpoints such that each stereoscopic image comprises at least a left image and a right image;

obtaining depth information, the depth information indicating a distance in a depth direction of the one or more stereoscopic images, of at least two subjects contained in the one or more stereoscopic images;

generating a depth image by positioning at least two subject images, which are each an image corresponding to one of the at least two subjects contained in the one or more stereoscopic images, while relating the distance in the depth direction of the at least two subjects, to a distance in the depth direction from a reference position to a position of the subject images;

controlling display of the subject images positioned in the depth image in a manner that at least one of the subject images is rotated about an axis perpendicular to the depth direction by a different amount of rotation than another one of the subject images; and displaying the depth image with display of the subject images contained therein, among which at least one of the subject images is controlled to be rotatable.

\* \* \* \* \*